July 5, 1960  A. J. CORSON  2,944,215
SUPPRESSED ZERO FREQUENCY METER CIRCUIT
Filed April 25, 1958

Inventor:
Almon J. Corson
by Richard E. Hosley
His Attorney

United States Patent Office 2,944,215
Patented July 5, 1960

2,944,215

SUPPRESSED ZERO FREQUENCY METER CIRCUIT

Almon J. Corson, Marblehead, Mass., assignor to General Electric Company, a corporation of New York Filed Apr. 25, 1958, Ser. No. 731,031

7 Claims. (Cl. 324—81)

This invention relates to frequency meters and, more particularly, to meters suitable for the vast majority of cases where the frequency to be measured and indicated varies only slightly from some standard value.

It is known to utilize a pair of off-resonance circuits, one resonant at a frequency below or at the lower end of the frequency range to be measured, and the other resonant at a frequency above or at the upper end of the frequency range to be measured, and to compare the effects of a given input frequency on the two circuits as an indication of the input frequency. It is desirable in such arrangements to utilize D.-C. instruments as frequency indicators because of the linear scales and the higher sensitivities obtainable and also because of the use of standard components made possible. However, the use of a D.-C. instrument in combination with the general type of differential frequency transducer described requires some means of rectification, introducing problems of vibration and errors due to voltage, wave form and temperature variations.

Also, where a D.-C. instrument has been used, it has been customary to terminate each resonant circuit in resistance and to connect a D.-C. voltmeter through a full-wave rectifier across the bridge thus formed. This method of measuring the differential voltage drop across the resistors limits both the sensitivity and accuracy of the measurement since there is attenuation of magnitude of the resonant circuit currents and the voltages developed across the resistances tend to vary with current flow if the circuits include non-linear elements such as rectifiers.

It is an object of this invention to provide an improved differential type resonant circuit frequency meter in which the resonant circuit currents themselves are utilized for frequency measurements rather than voltages produced by such currents.

It is another object of this invention to provide an improved differential type of frequency meter circuit utilizing half-wave rectification and a D.-C. instrument while providing improved accuracy and stability of frequency measurements.

It is another object of this invention to reduce the meter vibrations due to the rectified D.-C. pulses flowing therein and minimize spurious readings in a differential type of frequency meter.

Further objects and advantages of the present invention will become apparent as the following description proceeds and the features of novelty which characterize the invention will be pointed out with particularity in the claims annexed to and forming a part of this specification.

In accordance with one form of the invention, the currents developed in the pair of resonant circuits of a differential type frequency meter flow through a half-wave rectifying arrangement and a differential coil D.-C. instrument having a capacitor connected across the ends of the coils to produce a resultant indicative of frequency.

For a better understanding of this invention, reference may be had to the accompanying drawings in which.

Figure 1:
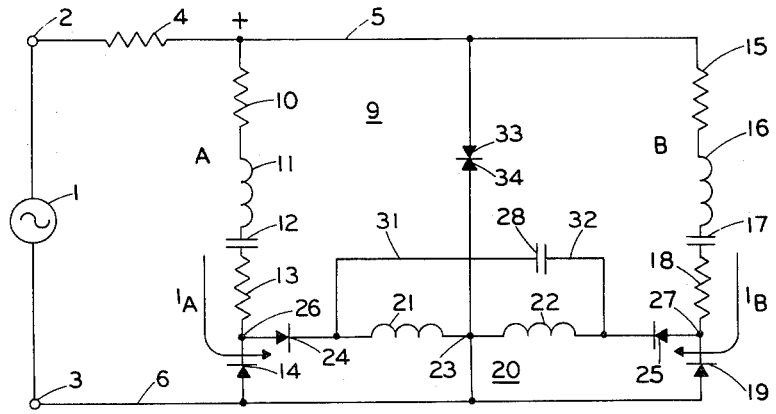
Figure 1 is a circuit diagram embodying the invention.

Referring to Figure 1, the alternating current signal to be measured 1 is applied across terminals 2 and 3 and through the series resistor 4 to the signal input lines or conductors 5 and 6 of the frequency transducer.

The signal to be measured is then applied across the frequency transducer 9 which comprises a pair of reactive frequency sensitive impedance branches A and B connected across the signal input lines 5 and 6, and each comprising a series circuit. Branch A comprises resistance 10, inductance 11, capacitance 12, temperature compensating resistance 13 and diode 14 connected in series while branch B comprises resistance 15, inductance 16, capacitance 17, temperature compensating resistance 18 and a diode 19 connected in series. In order to obtain maximum differential current for a given frequency range, it has been found desirable to utilize relatively large values of inductance and relatively small values of capacitance.

The practical limits of obtaining maximum current are dictated by the maximum permissible voltage rating and effective resistance of the reactor in relation to the total circuit resistance. The determination of circuit resistance involves the considerations that the resistance must be large enough to limit somewhat the large resonant currents which could be obtained but not so large as to limit it below the required output value. Furthermore, the temperature coefficient of resistance of the two circuits should be equal to minimize the tendency of changes in the branch currents due to changes in resistance with differential current flow. In general, it has been found that the total circuit resistance will increase with temperature, and compensation with negative temperature coefficient resistances such as 13 and 18 may be desirable. However, in practice it has been found that it is often unnecessary to utilize temperature compensation and if compensation is desirable, a single compensating resistance of suitable characteristics in only one of the branches may be sufficient rather than one in each branch. Alternatively, the compensation might be obtained by using reactors having temperature sensitive characteristics.

The D.-C. metering circuit 20 comprises differential coil sections 21 and 22 in series, with their common connection 23 connected to signal input line 6 and their other ends connected through diodes 24 and 25 to the junctions 26 and 27 between diode 14 and the remainder of branch A and diode 19 and the remainder of branch B, respectively. An anti-vibration capacitor 28 is connected directly across the coil sections 21 and 22.

Diodes 14, 19, 24 and 25 are selected such that there is an approximate match of their forward and leakage resistances. The diodes for best operation may be connected with the polarity such that the elements or ends are connected as shown in Figure 1. All of the diodes may be reversed in polarity and substantially the same differential current device may still be realized. Variations of the polarity arrangements of the diodes may be made without departing from the spirit or teachings of this invention. However, for best operation the diodes 24 and 25 should be in a back-to-back polarity relationship such that like elements are connected to the ends of coil sections 21 and 22 so as to prevent a current flow from either branch A or B to the other branch through both coil sections, and diodes 14 and 19 should be connected such that unlike polarities or elements are connected to diodes 24 and 25 at junctions 26 and 27.

A tapped single-conducting winding may be utilized to produce the coil sections 21 and 22 associated with the D.-C. indicating instrument 20. If the two coil sections are utilized in a radial field with the coils radially displaced from one another, it should be realized that there will be torque inequality with a more intense field being seen by the inner coil or the coil closer to the axis of rotation. Furthermore, changes in the circumferential gradient of the magnetic field will result in unequal torque components on the two coil sections with resultant error in indication. It therefore is desirable under certain circumstances to utilize a two-conductor or bifilar winding arrangement utilizing relatively fine wire of no more than several mills diameter. Such an arrangement results in coil sections 21 and 22 being substantially magnetically and spatially identical relative to the magnetic field in which they move. This eliminates the torque inequalities due to non-uniformities of the magnetic field linking each coil section and spurious indications resulting therefrom. The series arrangement of coils 21 and 22 requires only three lead-in spirals to the meter movement, one or more of which might constitute the spring arrangement which is utilized to return the pointer to center scale under no-load conditions. In operation it has been found that the capacitors 12 and 17 should be of the mica type for instruments in which the frequency span of the scale is relatively short but may be of the paper-dielectric type for long-span instruments where the higher capacitance drift of the paper capacitor can be tolerated. In short range instruments for the sake of standardization capacitances 12 and 17 may be of the same value. However on wider range instruments it is advisable to obtain a rough equality of circuit Q's and resultant symmetry of currents in the operating range by using capacitors of a different value in each branch.

Figure 2:
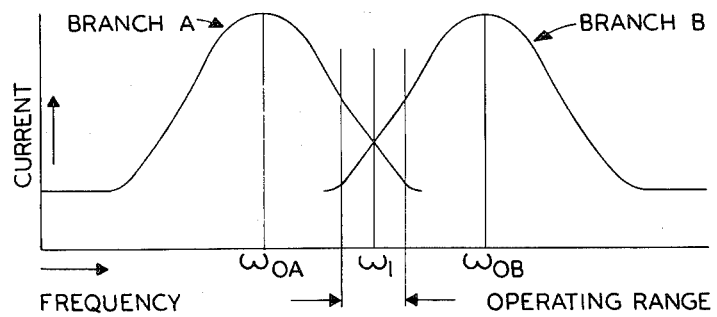
Figure 2 is a plot of the effect of frequency on the current flow in the resonant circuits.

In operation of the frequency transducing circuits in combination with the metering or current indicating arrangement of Figure 1, it should be noted that if branch A is designed to be resonant somewhat below the minimum frequency to be measured, branch B should be designed to be resonant at some frequency somewhat in excess of the maximum frequency to be measured. In such a circuit, if the frequency were to decrease from the center frequency, there would be an increase in current through circuit A while current in circuit B would increase on a rise in frequency. The circuit parameters are chosen such that currents $I_A$ and $I_B$ are equal at the normal or center frequency. Figure 2 illustrates the effect of frequency deviations on the current flow in the branch circuits. Referring to Figure 2, it should be noted that the operating range of the instrument is such that any frequency deviation causes an almost linear change of current in one branch with a substantially opposite change in the other branch.

Operation of the overall circuit may be best explained with reference to Figure 1. During the alternation of the input signal in which input line 5 is positive relative to input line 6, current in branch A will flow downward through resistance 10, inductance 11, capacitance 12 and resistance 13 to be blocked by diode 14 but passed by diode 24 so that all of the branch current $I_A$ will pass through coil section 21 to input line 6 via common connection 23. At the same time current will also be flowing downward in branch B through resistance 15, inductance 16, capacitance 17 and resistance 18 to be blocked by diode 19 but passed by diode 25 through coil sections 22 to input line 6 via common connection 23. The magnitudes of $I_A$ and $I_B$ will be dependent on the resonant frequencies of these branches as compared to the signal frequency.

Figure 3:
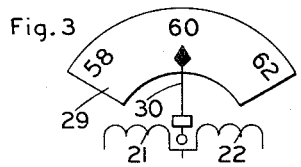
Figure 3 illustrates the scale arrangement of a particular suppressed zero instrument constructed in accordance with the teachings of the invention.

The D.-C. milliammeter associated with coil sections 21 and 22 may be conveniently of the center zero type in which the opposing torques produced by coil sections 21 and 22 will balance at the center frequency of the instrument but will cause a deflection of the indicating mechanism on either side of the center frequency, the direction being dependent upon the coil section which is carrying the greater current and thus producing the greater torque. The mechanical construction of such an instrument is well known in the art and will not be described in detail. A scale arrangement for such a frequency indicator over the range 58 to 62 cycles is shown in Figure 3. At the center frequency, 60 cycles, the current flow through sections 21 and 22 is equal so that the resultant torques produced cancel each other. If the input signal were to decrease in frequency, the current through branch A would increase, while that through branch B would decrease, resulting in a dynamic unbalance in the D.-C. milliammeter so that pointer 30 will be deflected to the left and indicate a lower frequency on scale 29. Conversely, if there is an increase in frequency, there will be an increased current flow through branch B and a decreased current flow through branch A so that the meter will deflect toward the right on scale 29.

On the negative alternations of the input signal, current will flow upward in branches A and B through diodes 14 and 19 but will be prevented from flowing through the coil sections 21 and 22 through action of diodes 24 and 25. For example, branch A current may flow through diode 14, resistance 13, capacitance 12, inductance 11, and resistance 10 to input line 5 but will be prevented from flowing through the coil sections and upward through branch B because of diode 25 which acts as an open circuit to such current flow. Current flow of branch B at the same time will be prevented from flowing through the coil sections 21 and 22 through the action of diode 24. It thus becomes apparent that metering circuit 20 is affected only through current flow produced by alternations of the input signal wherein line 5 is positive relative to line 6, and furthermore the circuit utilizes all of the current flow in the resonant branches to produce a torque for meter indication. Such an arrangement is obviously more sensitive and superior to the use of a circuit in which the resonant circuits terminate in resistances and the meter utilizes a differential voltage produced as an indication of frequency.

Figure 4:
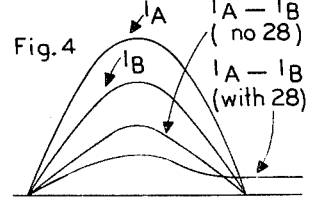
Figure 4 is a plot illustrating the effects of an anti-vibration capacitor on current pulses in the circuit.

Since the currents in differential coil sections 21 and 22 are low frequency D.-C. pulses, the moving system is subjected to a pulsating torque which tends to cause the pointer 30 to vibrate, making a reading difficult. Capacitor 28 is provided to eliminate the vibration without impairing the validity of the measurements of the currents through branches A and B. In operation when $I_A$ equals $I_B$, the capacitor terminals 31 and 32 are at the same potential since the resistances of the diodes 16 and 17 are substantially equal. If $I_A$ is greater than $I_B$ (due to a lower-than-center value input frequency), the terminal 31 is brought to a higher potential than terminal 32 and capacitor 28 is charged. A displacement or discharge current results and flows through the instrument coils during the inactive half cycles. The diodes 24 and 25 preclude any other effective shunt path for this current. The average value of the discharge current is equal to the average value of the charging current because the positive and negative alternations of the input frequency are substantially equal in duration and therefore the average reading is unchanged. However, the differential current and the resultant torque pulse produced is prolonged and the vibration is minimized. The effect of such an arrangement on the circuit current flow is shown diagrammatically in Figure 4.

In practice it is often found that in addition to the frequency varying, the voltage of the applied signal varies with changing load conditions of the system under measurement. Such variations in voltage are undesirable because the circuit is not designed for such variations and they are possible sources of error. A voltage transducer of the differential type under discussion is sensitive to variations of wave form in addition to variations of frequency. Voltage stabilizers which utilize saturable transformers or reactors as voltage sensitive elements have been found to be undesirable since they increase the harmonic content of the signal applied to the frequency transducer and the two resonant circuits have relative admittances which is not the same to these harmonics. It has been found that the voltage regulating arrangement shown in Figure 1 consisting of the silicon type Zener diodes 33 and 34 connected back-to-back produces a regulated voltage which is trapezoidal in shape and in which the harmonic content does not change appreciably with voltage. While the resonant circuits of branches A and B filter out most of the harmonic content, it has been found that it is not the harmonic content, per se, but change in harmonic content that causes the abnormal error experienced with the saturable type of voltage stabilizers. The use of the Zener diode stabilizer in combination with the resonant circuits results in a simple, yet more accurate, instrument in which the problems and errors produced by fluctuations of voltage are reduced.

The voltage regulating effect of the Zener diode is accomplished by the fact that when an A.-C. source is connected through a series resistor to a Zener diode, the reverse voltage drop across the diode is the applied voltage until the applied voltage equals the Zener voltage. The Zener voltage is then held substantially constant until the applied voltage decreases to the Zener value at which time the diode again becomes an open circuit and the voltage drop is coincident with the applied voltage until reversal of the voltage wave takes place. It is apparent that with the back-to-back arrangement shown the voltage regulation takes place during both the positive and negative alternations of the input signal.

The following table lists the value of the circuit components which have been found to be desirable for a frequency meter of the circuit configuration shown in Figure 1 without temperature compensating resistances 13 and 18 and which spans the range of 58 to 62 cycles for use on a 120-volt source:

| Part designation: | Value |
| --- | --- |
| 4 | 5000 ohms, 10 w. |
| 10 | 831 ohms. |
| 11 | 23.6 henries. |
| 12, 17 | .25 mf. |
| 15 | 781 ohms. |
| 16 | 34.8 henries. |
| 28 | 45 mf. |
| 14, 24, 25, 19 | Type 1N91 diodes. |
| 33, 34 | Type 4SV-13 diodes. |

Figure 5:
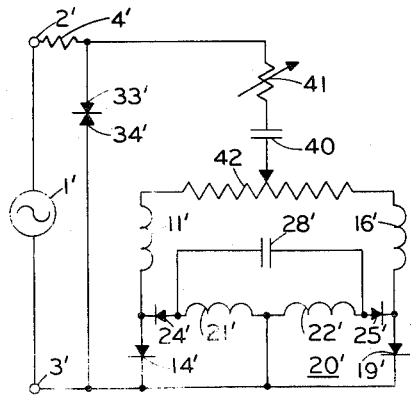
Figure 5 is a circuit diagram showing an alternate simplified circuit embodying the invention.

Figure 5 shows a simplified version of the resonant branches A and B. Referring to Figure 5, it should be noted that corresponding components to that shown in Figure 1 are marked with a prime ('). It should be noted that only a single capacitor 40 is required rather than a capacitor in either branch. Furthermore, a resistance 41 of the variable type is utilized as a range adjustment while a variable resistance 42 is utilized as a mid-scale adjustment. The operation of this circuit is similar to that described for Figure 1.

Having thus described the invention, it is to be understood that the foregoing disclosure relates only to preferred embodiments of my invention and that numerous modifications or alterations may be made therein without departing from the spirit and scope of my invention as set forth in the appended claims.

What I claim as new and desire to secure by Letters Patent of the United States is:

1. In a frequency meter of the differential type utilizing a first reactive circuit resonant at a preselected frequency and a second reactive circuit resonant at a preselected higher frequency with each adapted to be connected across the conductors supplying the signal under measurement, a metering circuit adapted to indicate the difference of current flowing in said reactive circuits as a measure of frequency of said signal under measurement, said metering circuit comprising a first diode connected in series through a first junction with said first reactive circuit, a second diode connected in series through a second junction with said second reactive circuit, said first and second diodes connected such that like elements are nearest the same signal conductor, a third and a fourth diode with unlike elements of said first and third diodes being connected at said first junction and unlike elements of said second and fourth diodes being connected at said second junction, a first and a second differential meter coil associated with a direct current indicating instrument, said first and second coils being connected in series and between the ends of said third and fourth diodes remote from said junctions, the junction of said coils being connected to the input conductor associated with the elements of said first and second diodes which are remote from said junctions, a capacitor connected across the ends of said coils, a fifth diode and a sixth diode exhibiting Zener characteristics and connected in a back-to-back arrangement across said input signal in series with an impedance, and said coils being arranged so as to produce opposing torques upon said instrument due to the rectified current pulses flowing therein.

2. In a frequency meter of the differential type utilizing a first circuit resonant at a preselected frequency and a second circuit resonant at a preselected higher frequency with each adapted to be connected across the conductors supplying the signal under measurement, a metering circuit adapted to indicate the difference of current flowing in said resonant circuits as a measure of the frequency of said signal under measurement, said metering circuit comprising a first diode connected in series through a first junction with said first resonant circuit, a second diode connected in series through a second junction with said second resonant circuit, a third and a fourth diode with unlike elements of said first and third diodes being connected at said first junction and unlike elements of said second and fourth diodes being connected at said second junction, a first and a second differential meter coil associated with a direct current indicating instrument, said first and second coils being connected in series and between the other elements of said third and fourth diodes, the junction of said coils being connected to the input conductor associated with the ends of said first and second diodes which are remote from said junctions, a capacitor connected across the junctions of said coils and said third and fourth diodes, a resistance in at least one of said resonant branches having a temperature coefficient of resistance such as to compensate for the changes of resistance of the metering circuit with current flow, and said coils being arranged so as to produce opposing torques upon said instrument due to the rectified current pulses flowing therein.

3. For use in a frequency meter of the differential resonance type utilizing first and second circuits to develop differential currents in response to frequency variations of an input signal, a metering circuit comprising a first diode in series with said first circuit and the input signal, a second diode in series with said second circuit and the input signal, a first and second meter coil associated with an indicating instrument, one end of said first coil being connected through a third diode to a first junction between said first circuit and first diode, one end of said second coil being connected through a fourth diode to a second junction between said second circuit and said second diode, said diodes being connected with unlike elements of said first and third and said second and fourth diodes, respectively, connected together, and the other ends of said coils being connected to the input signal and arranged to produce opposing torques upon said indicating instrument through current flow therethrough from said first and second circuits.

4. For use in a frequency meter of the differential resonance type utilizing first and second circuits to develop differential currents in response to frequency variations of an input signal, a metering circuit comprising a first diode in series with said first circuit and the input signal, a second diode in series with said second circuit and the input signal, a first and second meter coil associated with a direct current indicating instrument, one end of said first coil being connected through a third diode to a first junction between said first circuit and first diode, one end of said second coil being connected through a fourth diode to a second junction between said second circuit and said second diode, said diodes being connected with unlike elements of said first and third and said second and fourth diodes, respectively, connected together at said junctions, the other ends of said first and second coils being connected to the ends of said first and second diodes, respectively, which are remote from said junctions, said coils being arranged to produce opposing torques upon said indicating instrument through current flow therethrough from said first and second circuits.

5. For use in a frequency meter of the differential resonance type utilizing first and second circuits to develop differential currents in response to frequency variations of an input signal, a metering circuit comprising a first diode in series with said first circuit and the input signal, a second diode in series with said second circuit and the input signal, a first and second meter coil associated with a direct current indicating instrument, one end of said first coil being connected through a third diode to a first junction between said first circuit and first diode, one end of said second coil being connected through a fourth diode to a second junction between said second circuit and said second diode, said diodes being connected with unlike elements of said first and third and said second and fourth diodes, respectively, connected together, a capacitor connected across the said one ends of said coils, and the other ends of said coils being connected to the input signal and arranged to produce opposing torques upon said indicating instrument through current flow therethrough from said first and second circuits.

6. For use in a frequency meter of the differential resonance type utilizing first and second circuits to develop differential currents in response to frequency variations of an input signal, a metering circuit comprising a first diode in series with said first circuit and the input signal, a second diode in series with said second circuit and the input signal, a first and second meter coil associated with a direct current indicating instrument, one end of said first coil being connected through a third diode to a first junction between said first circuit and first diode, one end of said second coil being connected through a fourth diode to a second junction between said second circuit and said second diode, said diodes being connected with unlike elements of said first and third and said second and fourth diodes, respectively, connected together at said junctions, said second and fourth diodes having like elements connected to said one ends of said coils, and the other ends of said first and second coils being connected to the ends of said first and second diodes, respectively, which are remote from said junctions, said coils being arranged to produce opposing torques upon said indicating instrument through current flow therethrough from said first and second circuits.

7. For use in a frequency meter of the differential resonance type utilizing first and second circuits to develop differential currents in response to frequency variations of an input signal, a metering circuit comprising a first diode in series with said first circuit and the input signal, a second diode in series with said second circuit and the input signal, a first and second meter coil associated with a direct current indicating instrument, one end of said first coil being connected through a third diode to a first junction between said first circuit and first diode, one end of said second coil being connected through a fourth diode to a second junction between said second circuit and said second diode, said diodes being connected with unlike elements of said first and third and said second and fourth diodes, respectively, connected together at said junctions, said second and fourth diodes having like elements connected to said one ends of said coils, the other ends of said first and second coils being connected to the ends of said first and second diodes, respectively, which are remote from said junctions, and a capacitor connected across the said one ends of said coils, said coils being arranged to produce opposing torques upon said indicating instrument through current flow therethrough from said first and second circuits.

References Cited in the file of this patent

UNITED STATES PATENTS

| | | |
|---|---|---|
| 2,087,652 | Oakley | July 20, 1937 |
| 2,290,327 | Hansell | July 21, 1942 |
| 2,485,577 | Dubin | Oct. 25, 1949 |
| 2,594,091 | Summerhayes | Apr. 22, 1952 |
| 2,693,572 | Chase | Nov. 2, 1954 |
| 2,854,651 | Kircher | Sept. 30, 1958 |

FOREIGN PATENTS

| | | |
|---|---|---|
| 616,325 | Great Britain | Jan. 19, 1949 |
| 813,861 | Germany | Sept. 17, 1951 |
| 843,444 | Germany | July 7, 1952 |
| 712,527 | Great Britain | July 28, 1954 |
| 727,434 | Great Britain | Mar. 30, 1955 |